(12) United States Patent
White, III et al.

(10) Patent No.: US 11,565,806 B2
(45) Date of Patent: *Jan. 31, 2023

(54) METHOD OF NAVIGATING AN UNMANNED AERIAL VEHICLE FOR STREETLIGHT MAINTENANCE

(71) Applicant: CIMCON Lighting, Inc., Billerica, MA (US)

(72) Inventors: William Anthony White, III, Carlisle, MA (US); Anil Agrawal, Westford, MA (US)

(73) Assignee: CIMCON Lighting, Inc., Bedford, MA (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/930,024

(22) Filed: May 12, 2020

(65) Prior Publication Data

US 2020/0269976 A1    Aug. 27, 2020

Related U.S. Application Data

(62) Division of application No. 16/223,440, filed on Dec. 18, 2018, now Pat. No. 10,661,898.

(60) Provisional application No. 62/688,154, filed on Jun. 21, 2018.

(51) Int. Cl.
| | | |
|---|---|---|
| *B64C 39/02* | (2006.01) | |
| *B64D 1/12* | (2006.01) | |
| *B64D 1/22* | (2006.01) | |
| *B64D 1/08* | (2006.01) | |

(52) U.S. Cl.
CPC ............ *B64C 39/024* (2013.01); *B64D 1/12* (2013.01); *B64D 1/22* (2013.01); *B64C 2201/126* (2013.01); *B64C 2201/128* (2013.01); *B64C 2201/141* (2013.01); *B64D 1/08* (2013.01)

(58) Field of Classification Search
CPC ... B64C 39/024; B64C 2201/128; B64D 1/12; B64D 1/22
See application file for complete search history.

(56) References Cited

U.S. PATENT DOCUMENTS

| | | | |
|---|---|---|---|
| 9,387,928 B1* | 7/2016 | Gentry | B60L 53/00 |
| 9,711,851 B1 | 7/2017 | Cesarno | |
| 9,815,197 B1* | 11/2017 | Pickover | B25J 9/161 |
| 10,661,898 B2* | 5/2020 | White, III | B64D 1/12 |
| 2009/0050750 A1 | 2/2009 | Goossen | |
| 2011/0051785 A1 | 3/2011 | Kenington | |
| 2016/0229556 A1 | 8/2016 | Zhou | |
| 2016/0236346 A1 | 8/2016 | Lee | |

(Continued)

*Primary Examiner* — Jessica B Wong
(74) *Attorney, Agent, or Firm* — Fish & Richardson P.C.

(57) ABSTRACT

An unmanned aerial vehicle (UAV) includes a body that supports one or more rotors, the one or more rotors each driven by a motor and configured to provide lift to the body. The UAV further includes a parts handler coupled to the body, the parts handler configured to grasp a payload, and rotate the payload with respect to an external structure to couple the payload to, or decouple the payload from, the external structure. The UAV includes a stabilizing mechanism extending from the body, the stabilizing mechanism configured to contact the external structure without transferring entire weight of the UAV to the external structure and prevent rotation of the body when the part-handler rotates the payload.

20 Claims, 12 Drawing Sheets

(56) References Cited

U.S. PATENT DOCUMENTS

| | | |
|---|---|---|
| 2016/0340006 A1 | 11/2016 | Tang |
| 2017/0057628 A1 | 3/2017 | Holly |
| 2017/0193829 A1 | 7/2017 | Bauer |
| 2019/0003687 A1* | 1/2019 | Chiu .................... F21S 8/086 |
| 2019/0042227 A1 | 2/2019 | Sharma |
| 2019/0072953 A1 | 3/2019 | Maheshwari |
| 2019/0389576 A1 | 12/2019 | White |
| 2020/0011487 A1* | 1/2020 | Creusen .................. F21K 9/20 |
| 2020/0132286 A1* | 4/2020 | Carlén ................ B64C 39/024 |

* cited by examiner

METHOD OF NAVIGATING AN UNMANNED AERIAL VEHICLE FOR STREETLIGHT MAINTENANCE

CLAIM OF PRIORITY

This application claims priority under 35 U.S.C. § 120 to U.S. patent application Ser. No. 16/223,440, filed on Dec. 18, 2018, which claims priority under 35 U.S.C. § 119(e) to U.S. Patent Application Ser. No. 62/688,154, filed on Jun. 21, 2018, the entire contents of which are hereby incorporated by reference.

TECHNICAL FIELD

This disclosure generally relates to an unmanned aerial vehicle (UAV) configured to interact with existing civil infrastructure.

BACKGROUND

Streetlights often include a sensor package that is used for operations of the streetlight. The sensor package can include a photocell. The photocell is configured to receive ambient light from the environment and provide a signal to a controller of the streetlight. The amount of light detected by the photocell is measured and used to determine whether the streetlight be turned on, turned off, dimmed, and so forth. The photocell often is installed or coupled to the streetlight on a top of a luminaire of the streetlight.

SUMMARY

In one aspect, this document features an unmanned aerial vehicle (UAV) that includes a body that supports one or more rotors, a parts handler, and a stabilizing mechanism. The one or more rotors are each driven by a motor and configured to provide lift to the body. The parts handler is coupled to the body, and configured to grasp a payload, to rotate the payload with respect to an external structure to couple the payload to, or decouple the payload from, the external structure. The stabilizing mechanism extends from the body, and is configured to contact the external structure without transferring entire weight of the UAV to the external structure, and prevent rotation of the body when the parts handler rotates the payload.

Implementations can include one or more of the following features.

The UAV can include a first actuator to move the parts handler along a first axis, a second actuator to move the parts handler along a second axis, a third actuator to move the parts handler along a third axis, and a fourth actuator to rotate the parts handler around the third axis. The UAV can include one or more cameras configured to provide a video of a work space of the parts handler, and an image analysis engine configured to receive data from the one or more cameras, and determine a pose of the UAV with respect to the external structure based on the received data. The image analysis engine can be configured to determine the pose by comparing images received in the received data a set of training data. The set of training data can include a plurality of images depicting photocells each at a known position and orientation relative to the parts handler and a plurality of images depicting streetlights each at a known position and orientation relative to the parts handler. The parts handler can include a clamp that includes a plurality of prongs for grasping a photocell. The stabilizing mechanism can include a tail extending from the UAV, the tail having an anti-rotation plate near an end of the tail opposite the body of the UAV. The UAV can also include a counterweight configured to balance the tail to cause the UAV to have a center of gravity near a center of the body. The stabilizing mechanism can include a plurality of legs configured to flex around at least a portion of the external structure. At least one leg of the plurality of legs includes one or more actuators for moving at least a portion of the at least one leg of the plurality to change a configuration of the at least one leg of the plurality. The UAV can include an energy source for providing energy for rotational acceleration of the parts handler, the energy source being configured to release a burst of power. The UAV can include a transceiver configured to communicate with a remote computing system, wherein the UAV can be controlled via one or more controls of the remote computing system. The parts handler can include a load cell configured to measure a load exerted on the parts handler. The UAV can include internal communication management system configured to communicate with one or more other UAVs. The UAV can include a camera configured to capture one or more images of the stabilizing mechanism, and one or more processing devices. The one or more processing devices can be configured to determine, based on the one or more images, that the stabilizing mechanism is at a target position with respect to the external structure, and in response, send a control signal to the parts handler to rotate the payload.

The UAV and associated systems for maintaining streetlights described herein enables at least the following advantages. While photocells themselves are inexpensive, the labor cost of replacing failed photocells that are integrated with streetlights is relatively expensive. The labor cost of replacing the photocell (and its associated sensor package) on a streetlight is also a barrier to upgrading streetlights to include networked controllers that can be accessed from a remote computing device. The photocell (e.g., the photocell sensor package) is coupled to the streetlight. For example, the photocell is plugged into a luminaire of the streetlight, screwed into a receptacle, or otherwise affixed to the streetlight. To remove the photocell, a maintenance worker unplugs, unscrews, or otherwise decouples the photocell from the streetlight. The UAV enables one or both of removal and installation of the photocells on the streetlight without requiring a maintenance worker to manually replace the photocell, and/or its associated controller, by hand. The UAV is configured to couple the photocell with the streetlight, such as by rotating the photocell sensor package into a threaded receptacle, plugging the photocell into a receiver, or otherwise installing the photocell on the streetlight. The UAV is configured to unplug the photocell, unscrew the photocell from a threaded receptacle, or otherwise remove the photocell from the streetlight. The UAV thus facilitates installation and removal of photocell sensors from streetlights. The UAV removes a requirement of manual installation and removal of photocells on streetlights, reducing a cost of maintaining and/or upgrading the streetlights.

Additionally, the load-bearing capability of a streetlight is assumed minimal. If a weight is applied to the luminaire, the streetlight may be damaged. The UAV is configured to remove, install, and/or replace a photocell without landing on the luminaire of the streetlight and applying a weight or load to the luminaire.

Two or more of the features described in this disclosure, including those described in this summary section may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

Figure 1A:
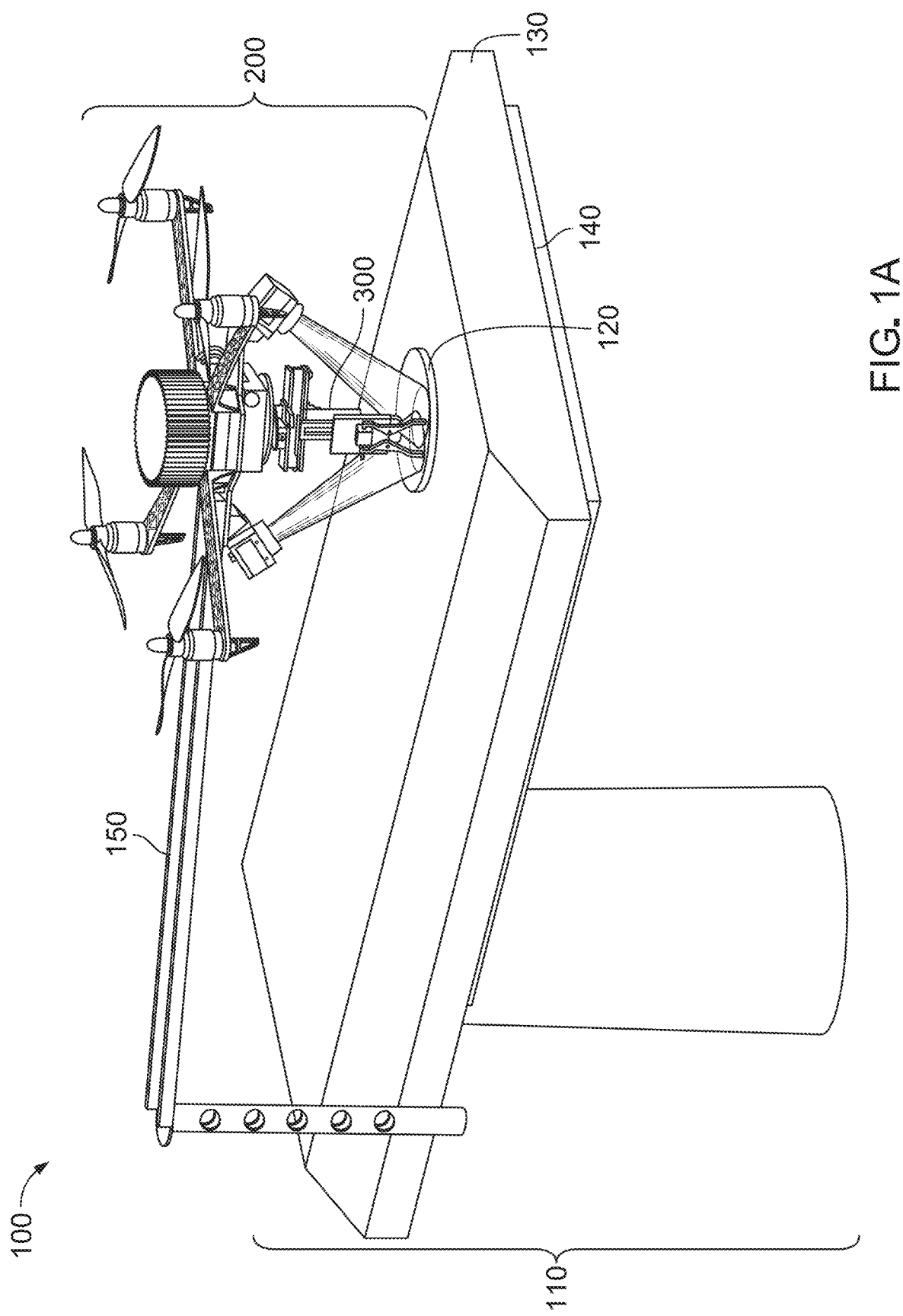
FIG. 1A shows an example of an environment for infrastructure maintenance using a UAV.

This document describes systems and techniques for maintenance of a streetlight system. Specifically, this document describes an unmanned aerial vehicle (UAV) configured to replace photocells deployed on individual streetlights. In some implementations, a fleet of UAVs is used for replacing photocells deployed on each streetlight of a streetlight system.

A streetlight of a streetlight system includes a photocell. The photocell (e.g., photocell 120 of FIG. 1A) includes a sensor configured to detect an amount of light at the photocell and output a signal representative of the measured amount of light. In this document, reference to a photocell can include the entire photocell sensor package, rather than just the light-sensitive sensor itself. For example, if the photocell is housed in a sensor package with other sensors, computing devices, etc., the entire sensor package may be referred to as a "photocell" that is coupled (e.g., affixed) to the streetlight. Photocells can be used for switching individual streetlights on and off based on ambient light conditions. A system can use the photocells to make lighting decisions either manually or autonomously based on ambient weather conditions. In some implementations, the photocell is in communication with a streetlight controller configured to control the streetlight, either autonomously or in response to instructions received from a remote computing system.

When a photocell fails, manually replacing the photocell can be relatively expensive. Typically, a maintenance worker manually replaces the photocell by hand. The maintenance worker typically scales the streetlight light to directly access a luminaire of the streetlight. The luminaire includes the enclosure that houses the lamp and associated circuitry of a streetlight. The associated circuitry can be electrically connected to the photocell. The UAVs described herein are configured to enable removal of a photocell from the luminaire without requiring a worker to directly access the luminaire. In some implementations, the UAV is controlled by a worker using a remote computing system, such as a controller. In some implementations, the UAV is semi-autonomous. The UAV is configured to receive instructions (e.g., from a remote device) for when and where to replace a photocell. In some implementations, the UAV is driven or guided to a photocell on a streetlight, and the UAV autonomously detects and replaces the photocell. In some implementations, the UAV will also navigate autonomously to the photocell location. For example, the UAV navigates from a base station. In one example, the base station includes a stationary shelter. In another example, the base station includes a mobile shelter, such as an automobile or other similar vehicle. Examples are described in further detail below.

The streetlight controllers can include one or more computing devices that can be configured to control various operations of a streetlight, based on, for example, instructions received from a remote control center. In some implementations, in order to install a streetlight controller at a streetlight of a streetlight network, an installed photocell may need to be removed or replaced with a different photocell.

FIG. 1A shows an example environment 100 for maintenance of infrastructure (e.g., a streetlight) by a UAV. Specifically, FIG. 1A shows an environment 100 for replacement of a photocell 120 of a streetlight by a UAV 200. The UAV 200 is configured to approach a streetlight 110 and detect the photocell 120 (e.g., by one or more sensors as described below in further detail with respect to FIG. 1B). In some implementations, the photocell 120 is disposed in a luminaire 130. The luminaire includes a housing of the streetlight 110. The luminaire 130 houses a lighting element 140 (or a plurality of lighting elements) of the streetlight 110. In some implementations, the luminaire houses associated electrical circuitry, such as drivers, power converters, etc. The photocell 120 is disposed in the luminaire 130 such that the photocell is accessible from above the luminaire. For example, the photocell 120 can be disposed on a top surface of the luminaire such that the photocell is accessible from above the luminaire.

The UAV 200 includes a mechanism for flying to and from the luminaire 130. In some implementations, the UAV 200 includes one or more rotors driven by a motor or a plurality of motors. For example, the UAV 200 can include a quadcopter that is capable of a stable flight pattern, such as hovering, moving in any direction in flight, etc. Generally, the luminaire 130 is connected to the top of streetlight pole such that it is at a significant height from the ground. For example, the luminaire 130 may be difficult to reach by a person standing on the ground. The UAV 200 is configured to fly from approximately a ground level to the luminaire 130 for maintenance of the streetlight 110. The UAV 200 can hover near (e.g., above) the luminaire 130 when installing or removing the photocell 120. The UAV 200 includes a parts handler 300 that is configured to remove the photocell 120 from the luminaire 130, install a new photocell 120 in the luminaire 130, or both. The parts handler 300 is configured to physically remove and/or install photocells from the streetlight 110, and is described in further detail with respect to FIG. 3.

Figure 1B:
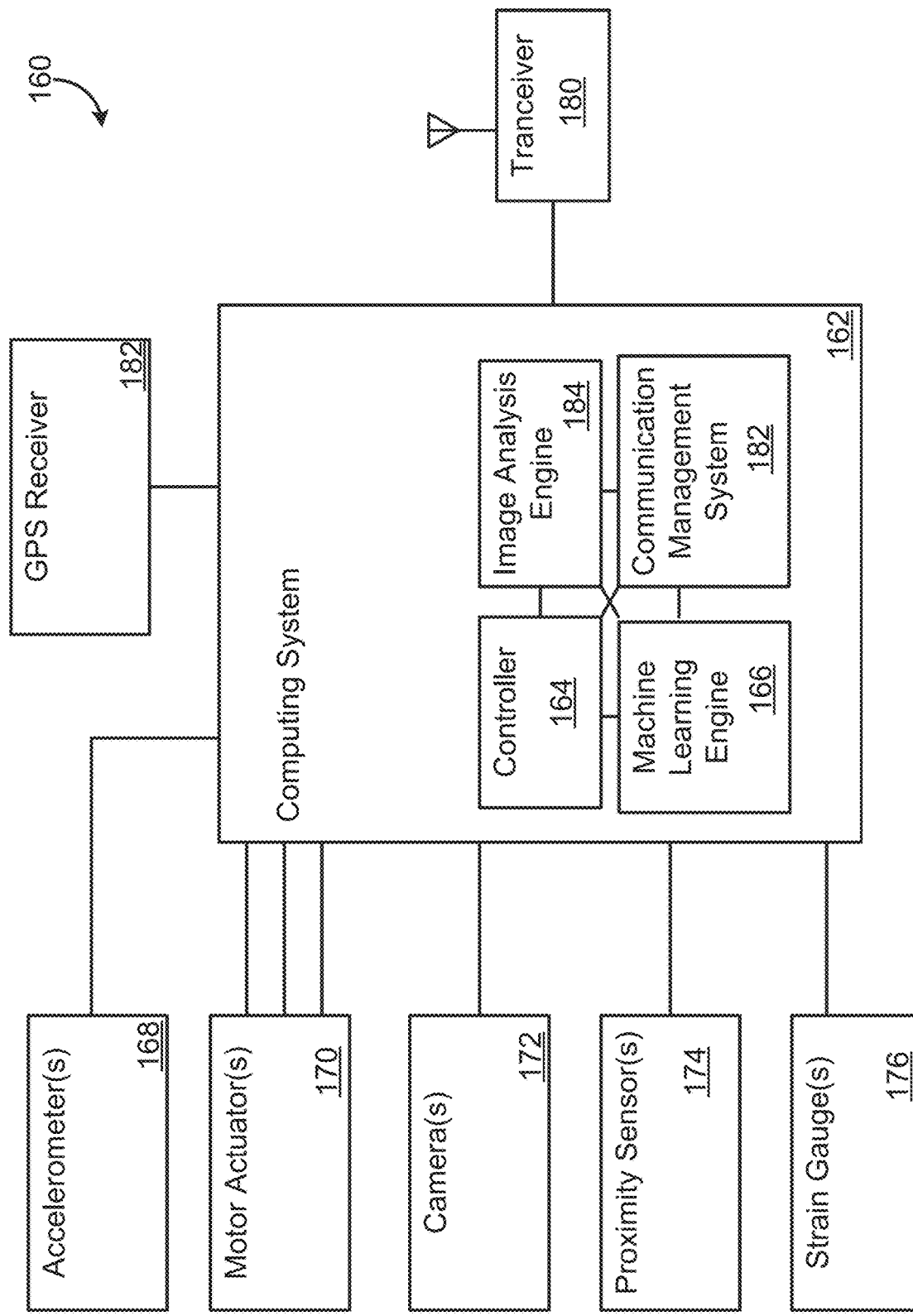
FIG. 1B shows an electrical system of a UAV.

FIG. 1B shows a block diagram including an electronic system 160 of the UAV 200. The electronic system includes one or more computing devices, including a computing system 162. The computing system can include a controller 164, an image analysis engine 184, a machine-learning engine 166, and an internal communication management system 182. The controller 164 is configured for sending and receiving commands from one or more of the motors and sensors of the UAV 200. In some implementations, the motors and sensors can include one or more accelerometers 168, motor actuators 170, navigation cameras 172, proximity sensors 174, a force sensor 176 (e.g., a strain gauge), and a Global Positioning System (GPS) receiver 182. In some implementations, the controller 164 can include a motor control system. In some implementations, the controller communicates with a transceiver 180 for sending and receiving data from the UAV 200 to a remote system (not shown). In some implementations, the computing system 162 is configured for autonomous navigation of the UAV 200. The computing system 162 can include the controller 164 of the UAV 200 or can be separate from the controller. The computing system can include the machine-learning engine 166 for navigation and other operations of the UAV 200, as described below with respect to FIG. 2B. In some implementations, operations of the controller 164, image analysis engine 184, machine learning engine 166, and communication management system 182 can be executed by a single processing device or a plurality of processing devices.

The one or more accelerometers 168, cameras 172, proximity sensors 174, and GPS receiver are configured to assist the UAV 200 in navigation and other operations. The cameras can include a tail camera, a forward camera, an aft camera, and a detail camera, which are each described in further detail below with respect to FIG. 2B. The proximity sensors 174 can include one or more of laser or infrared ranging sensors (e.g., LiDAR, LaDAR, etc.), ultrasonic sensors, etc. In some implementations, the computing system is configured to perform Simultaneous Localization and Mapping (SLaM) using data from the cameras 172, the proximity sensors 174, the GPS 182, and the accelerometers 168. In some implementations, the machine-learning engine 166 can assist in navigation, as described below. One or more other such navigational algorithms can be used. The UAV 200 and the parts handler 300 are described in further detail with respect to FIGS. 2A-5B.

Referring back to FIG. 1A, the photocell 120 includes a light-sensitive sensor configured to detect an amount of light at the photocell. The sensor of the photocell 120 outputs a signal representative of the measured amount of light. The signal can be input to a controller associated with the streetlight 110, or to a controller that disposed as a part of the photocell 120. In some implementations, the photocell 120 includes a photocell sensor package, rather than just the light-sensitive sensor itself. For example, if the photocell is housed in a sensor package with other sensors, computing devices, etc., the entire sensor package may be referred to as a "photocell" that is coupled (e.g., affixed) to the streetlight 110. In some implementations, the photocell 120 includes only the light-sensitive sensor and associated hardware (not shown) enabling the photocell 120 to be modular. The associated hardware includes one or more of a sensor housing, electronics for mounting the sensor itself, and so forth. For example, the associated hardware may include a controller, a printed circuit board (PCB), a housing with a threaded screw, a housing with a plug, wires, and so forth.

The photocell 120 is coupled to the luminaire 130 such that the photocell 120 is modular with respect to the luminaire 130. In some implementations, the photocell 120 is screwed into a threaded receptacle. In some implementations, the photocell 120 is plugged into the luminaire 130. The photocell 120 and means of coupling the photocell 120 to the luminaire 130 are described in further detail below with respect to FIGS. 6A-6C.

The UAV 200 positions itself above the photocell 120. The UAV 200 does not rest on the luminaire 130 of the streetlight 110 to cause a load on the luminaire. The load-bearing capacity of the luminaire 130 is unknown and can vary greatly from one streetlight to the next. Because of this, the UAV 200 is configured to remove, install, and/or replace the photocell 120 of the streetlight 110 without landing (e.g., resting the entire weight of the UAV) on the luminaire 130. In some implementations, the UAV 200 is configured to hover above the luminaire 130 while accessing the photocell 120. The UAV 200 includes a stabilizing mechanism 150 for bracing the UAV 200 against an external structure, such as the streetlight 110. The stabilizing mechanism 150 prevents the UAV 200 from moving relative to the streetlight 110. For example, the stabilizing mechanism 150 can provide a brace against an external structure (e.g., the streetlight 110 or another nearby structure) to counter a torque caused by removing (e.g., unscrewing, unplugging, etc.) the photocell 120 from the streetlight. The stabilizing mechanism 150 can include a tail, one or more legs, and so forth as described below in relation to FIGS. 2A-5C. The stabilizing mechanism 150 shown in FIG. 1A includes a tail that extends from a body of the UAV 200 and braces against an external structure (e.g., luminaire 130). In some implementations, the stabilizing mechanism 150 can brace against another portion of the streetlight 110 and/or another structure near the streetlight.

The UAV 200, once positioned above the photocell 120, as shown in FIG. 1A, interacts with the streetlight 110 in order to replace, maintain, or remove the photocell 120. The UAV 200 is configured to remove a photocell 120, such as when the photocell 120 has failed, a newer model is to be added, or the photocell 120 otherwise should be replaced. When the UAV 200 is configured to remove the photocell 120, the UAV 200 decouples the photocell 120 from the luminaire 130, such as by using a parts handler 300. In some implementations, the UAV 200 then returns to a home base (e.g., a mobile base or a stationary base) to deposit the photocell 120. The UAV 200 (or a second UAV, not shown) returns to the streetlight 110 to install a new photocell 120.

In some implementations, a fleet of UAVs including UAV 200 can be coordinated to replace the photocell 120. For example, a first UAV (which can be UAV 200) can be configured to remove the photocell 120 from the streetlight 110, while a second UAV (which can be a copy of UAV 200) is configured to install a new photocell. In some implementations, the first and second UAVs are approximately identical. In some implementations, the first UAV includes specialized hardware and/or software for removal of the photocell 120 from the streetlight 110, and the second UAV includes specialized hardware and/or software for installation of the new photocell. For example, a difference between the first and second UAVs may be different versions of a hardware mechanism (e.g., parts handler 300). The first UAV can include a parts handler 300 optimized to remove the photocell 120 from the luminaire 130. The second UAV 200 can include a different version of the parts handler 300 that is optimized for installation of a new photocell 120. In another example, a difference between the first and second UAVs may be different versions of a software program. These implementations of the first UAV and the second UAV are described in further detail with respect to FIG. 2A-3.

In some implementations, the UAV 200 is configured perform both removal of the old photocell 120 and installation of a new photocell in a single trip. For example, the UAV 200 is configured to store the removed photocell 120 and install a new photocell that the UAV 200 has transported to the streetlight 110. The UAV 200 carries a new photocell 120 from the home base (not shown), removes the old photocell 120 from the streetlight 110, and installs the new photocell 120 in a single trip. In some implementations, the UAV 200 includes a second parts handler (not shown). The first parts handler and the second parts handler each can be optimized for removal and installation of the photocell 120, respectively. In some implementations, the UAV 200 can complete installation and removal of photocells with a single parts handler 300. The parts handler 300 can include a first portion for removal of the photocell 120 and a second portion for installation of a new photocell 120. In some implementations, the UAV 200 is configured to remove and/or install multiple photocells on respective streetlights. The UAV 200 includes a storage (not shown) for physically storing removed photocells or photocells to be installed on streetlights.

Figure 2A:
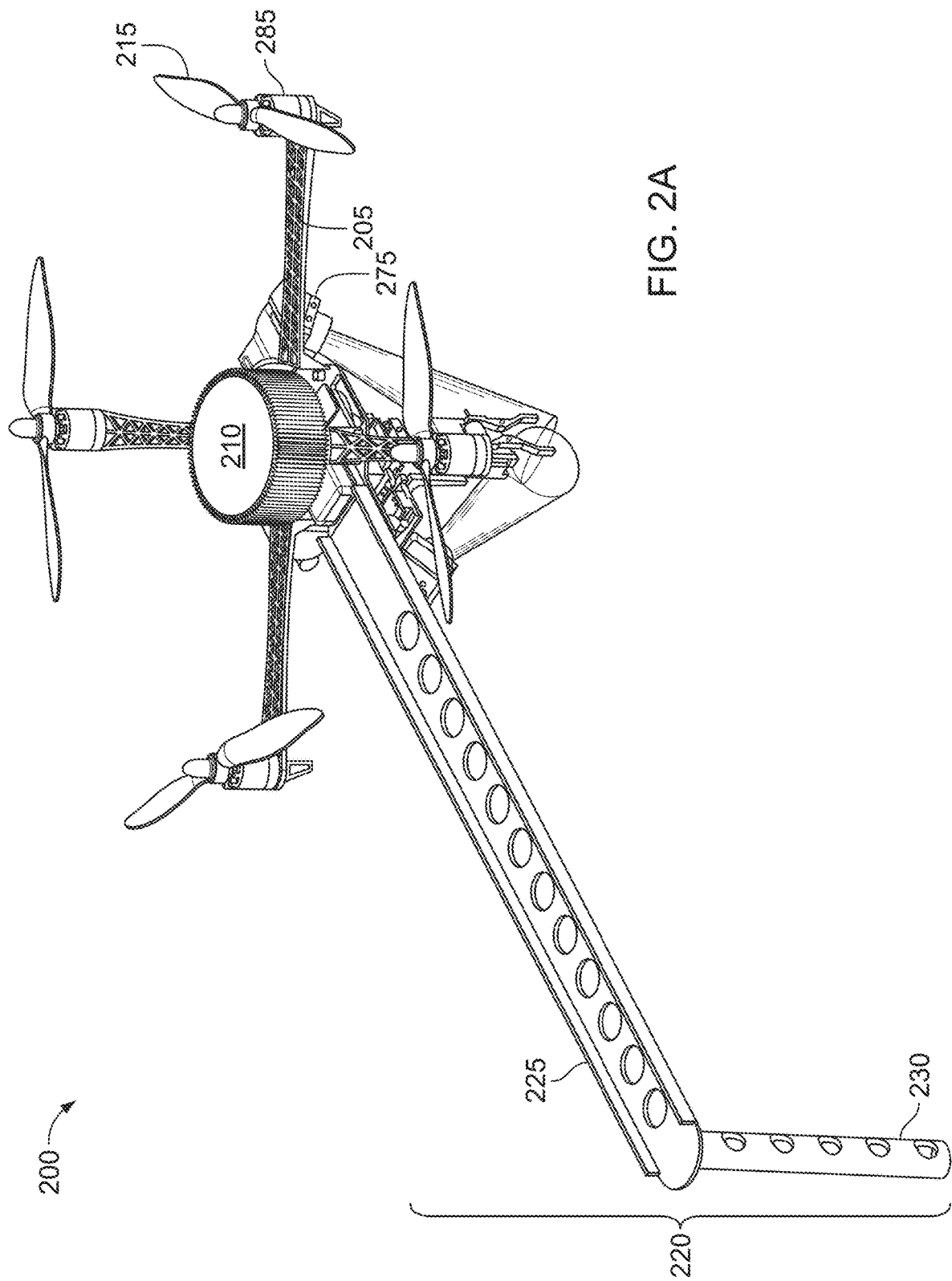
FIG. 2A shows an example UAV.
Figure 2B:
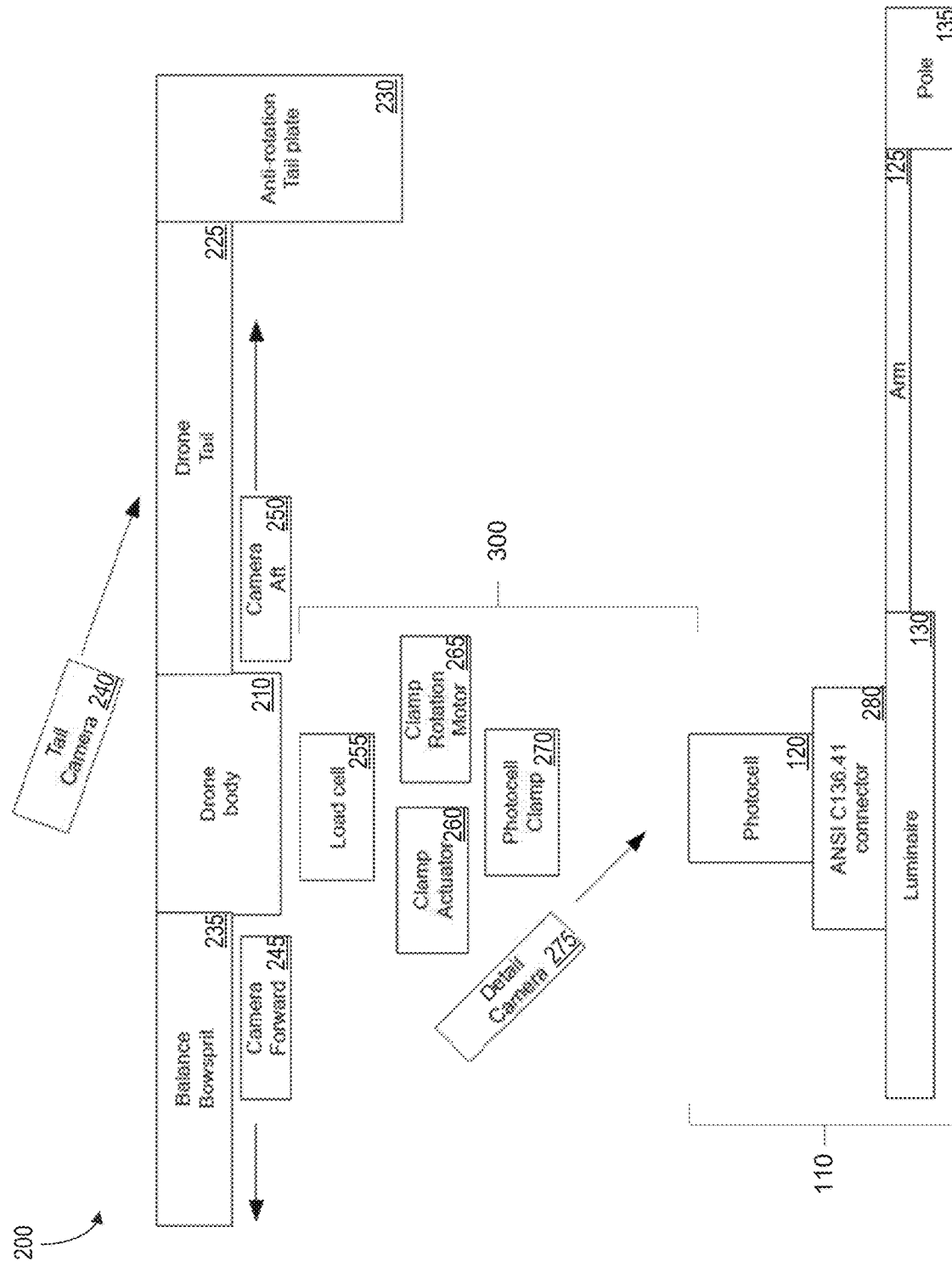
FIG. 2B shows a block diagram of example components of a UAV.

Turning to FIGS. 2A-2B, an example UAV 200 for performing maintenance operations on infrastructure is shown. FIG. 2A shows a graphic of the UAV 200. FIG. 2B shows a block diagram representing components of the UAV 200.

Referring to FIG. 2A, the UAV 200 includes a body 210 and one or more rotors, such as rotor 215, each driven by a motor, such as electric motor 285. Each rotor is affixed to the body 210 by a rigid arm, such as arm 205. In some implementations, the body 210, rotor 215, and arm 205 form a drone capable of lifting a payload, such as the parts handler 300 and other sensors of the UAV 200. In some implementations, the body 210, one or more rotors, and one or more arms form a quadcopter, such as depicted in FIG. 2A. Although FIG. 2A shows a quadcopter configuration for the body 210, rotor(s) 215, and arm(s) 205, any configuration of rotors, arms, and motors affixed to body 210 capable of lifting the body 210 and a payload can be used for the UAV 200. In some implementations, the body 210 includes a power source for powering both the motor(s) 285 configured to drive the rotor(s), but also for powering a controller (not shown) configured to control the UAV 200. The power source is also configured to power any sensors affixed to the UAV 200, as well as motors for operating the parts handler 300. In some implementations, the power source is a battery, such as a Lithium polymer battery. However, the UAV 200 can include other such power cells capable of powering the UAV.

The UAV 200 includes a stabilizing mechanism 220. For the UAV 200 of FIGS. 2A-2B, the stabilizing mechanism 220 includes a tail 225 and an anti-rotation tail plate 230. The stabilizing mechanism 220 is affixed to the body 210 of the UAV 200. The stabilizing mechanism 220 functions as a brace against an external structure (e.g., the streetlight 110) when the UAV 200 is removing or installing a photocell 120. For UAV 200, the stabilizing mechanism forms a long appendage configured to prevent the UAV 200 from rotating when the UAV 200 is unscrewing a photocell 120 from the luminaire 130. When the UAV 200 applies a torque to unscrew/screw in a photocell 120 into a threaded receptacle (not shown) on the luminaire 130, another torque is applied to the body 210 of the UAV 200 in the direction opposite of the rotation. To prevent the UAV 200 from rotating, the anti-rotation tail plate 230 of the stabilizing mechanism braces against the external structure (e.g., the luminaire 130 or another portion of the streetlight 110). The UAV 200 can thus apply a torque to the photocell 120 that is sufficient to remove the photocell 120 from the threaded receptacle of the luminaire 130. Without the stabilizing mechanism 220, the UAV 200 would rotate as it hovers above the luminaire 130. The UAV 200 is capable of applying sufficient torque to the photocell 120 to remove/install the photocell because a counter-rotational force is overcome by torque produced from the rotor(s) 215 and supplemented with the stabilizing mechanism 220. For example, the stabilizing mechanism 220 swings around until it contacts the streetlight 110 and fixes the rotational position of the UAV 200.

The anti-rotation tail plate 230 contacts the streetlight 110 during installation and/or removal of the photocell 120. When installing a photocell 120, the anti-rotation tail plate 230 swings in a first direction to contact a first side of the streetlight 110. When removing the photocell 120, the anti-rotation tail plate 230 swings in a second direction opposite the first direction to contact a second side of the streetlight 110 and brace the UAV 200. In some implementations, the anti-rotation tail plate 230 includes a rigid, planar surface having a large surface area to minimize the pressure on a portion of the streetlight 110 by the UAV 200. In some implementations, the anti-rotation tail plate 230 includes a cylindrical, tubular structure (shown in FIG. 2A) configured to minimize the weight of the stabilizing mechanism 220. The exact configuration of the stabilizing mechanism 220 can vary, and prevents rotation of the UAV 200 during removal and/or installation of a photocell 120 on the streetlight 110. For example, the length of the tail 225 can be made longer or shorter, depending on the weight that can be carried by the UAV 200 and the torque required for either removing or installing the photocell 120. The configuration of the stabilizing mechanism 220 can be customized to match a particular configuration of the streetlight 110. In some implementations, the length of the stabilizing mechanism can be between 10 centimeters and 250 centimeters. In some implementations, the anti-rotation tail plate extends from the tail between 10 centimeters and 100 centimeters.

Turning to FIG. 2B, a block diagram of the scene of FIG. 1A is shown. The UAV 200 is positioned above the streetlight 110. The streetlight 110 includes a photocell 120, a luminaire 130, an arm 125, and a pole 135. Other configurations of the streetlight 110 and the photocell 120 are possible. For example, the photocell positioning may be on a different portion of the streetlight such as a side, front, etc. of the streetlight. For example, the luminaire 130 can have one or more shapes, and can be directly attached to the pole 135. UAV 200 is configured to interact and maintain any streetlight configuration in which the photocell 120 is accessible from above the streetlight. In the example streetlight 110 of FIG. 2B, the photocell 120 is connected to the luminaire 130 by an ANSI C136.41 connector 280. However, any connector configured to enable communication between the photocell 120 and other portions of the streetlight 110 can be used.

The UAV 200, in addition to the features shown in FIG. 2A, includes a counterweight 235 to counter the weight of the stabilizing mechanism 220 extending from the body 210. The counterweight ensures that a center of gravity of the UAV 200 is approximately centered over the parts handler 300. The UAV 200 includes one or all of a tail camera 240, a forward camera 245, and an aft camera 250. The tail camera 240, the forward camera 245, and the aft camera 250 can each comprise a video camera or take one or more static images. For example, one or more of the tail camera 240, the forward camera 245, and the aft camera 250 can take an image only when needed to save power for the UAV 200 and to reduce a bandwidth of transmitting data to a remote computing system (when applicable). For example, one or more of the tail camera 240, the forward camera 245, and the aft camera 250 can capture images/video only when navigating, when another sensor (e.g., a proximity sensor, not shown) indicates that more navigation data are needed, when the UAV 200 approaches the streetlight 110, and so forth.

The tail camera 240 is mounted on the tail 225 of the stabilizing mechanism 220. The tail camera 240 is used for both navigation to and from the photocell 120. The tail camera 240 is used to verify that the stabilizing mechanism 220 is correctly positioned (e.g., braced) against the streetlight 110 before a torque is applied to the photocell 120. Verifying that the stabilization mechanism 220 is properly braced against an external structure (e.g., streetlight 110 or another structure) prevents an impact caused by rapid rotation of the UAV 200 once a torque is applied to the photocell 120. Such a rotation of the UAV 200 is prevented by the stabilizing mechanism 220. The rapid rotation of the UAV 200 caused by applying a torque to the photocell 120 can cause a loss of control of the UAV 200, damage to the UAV 200 or the streetlight 110, or cause the UAV 200 to move out of position to install or remove the photocell 120 from the luminaire 130, and such dangers are avoided. In some implementations, a controller (e.g., controller 164 and/or image analysis engine 184 of FIG. 1B) performs an image processing technique from images received from the tail camera 240 to automatically verify that the UAV 200 is properly braced against the streetlight 110. In some implementations, a user can view the video feed or images captured by the tail camera 240 to verify that the UAV 200 has braced itself or been controlled to brace against the streetlight 110 or other external structure.

In some implementations, the UAV 200 includes an energy store (not shown) configured to impart a sudden burst of angular momentum on the photocell 120, e.g. once the UAV 200 is braced. The energy store can be electrical (e.g., capacitive energy store), mechanical (e.g., a spring, tensioned cord, etc.), or a combination of electrical and mechanical. The energy store can assist the UAV 200 in overcome a static friction of the photocell 120 coupling.

The parts handler 300 is affixed to the body 210 of the UAV 200. The parts handler 300 includes a load cell 255, a clamp 270 for grasping the photocell 120, and one or more motors for controlling the parts handler 300, such as the clamp actuator 260 and the clamp rotation motor 265. The parts handler 300 is described in further detail with respect to FIG. 3.

One or more detail cameras, such as detail camera 275, are each aimed at the workspace of the parts handler 300. For example, cone 290 of FIG. 2A shows an example field of view of the details camera 275. The field of view shown is illustrative of the orientation of the details camera 275 rather than an indication of the actual limits of the field of view of the details camera. The detail camera 275 views the parts handler 300 and assists the UAV 200 with fine positioning control for positioning the UAV 200 above the photocell 120. The detail camera 275 can be activated once the UAV 200 is close to the photocell 120 (either automatically activated or manually activated). The detail camera 275 enables a fine positioning of the parts handler 300 over the photocell 120 to ensure that the parts handler 300 successfully couples with (e.g., grasps, claims, etc.) the photocell 120. The detail camera 275 video feed or images can be streamed to a remove computing system (not shown) for monitoring by a user.

The load cell 255 is configured to measure a load supported or exerted by the parts handler 300. The load cell 255 can include a force sensor 176 (e.g., a strain gauge). The load cell 255 sends a signal to the computing system 162 if the measured load exceeds a limit. In some implementations, a warning can be sent to disengage the UAV 200 from the streetlight 110. In some implementations, the UAV 200 drops a payload or releases the claim 270 of the parts handler 300 in response to detecting a load exceeding a threshold.

In some implementations, the UAV 200 performs image processing on images received from the detail camera 275 to automatically determine the relative position of the parts handler 300 with respect to the photocell 120. For example, the image analysis engine 184 is configured to process images from each of cameras 240, 245, 250, and 275. For example, feature detection, such as shape, line, color, or texture detection can be used. In some implementations, machine-learning techniques can be used for processing images, such as using the machine learning engine 166. In some implementations, feature detection is performed using a machine learning process. For example, a neural network operating on a controller of the UAV 200 or remote system in communication with the UAV 200 can be trained with training images of photocells and streetlight 110 features. A library of training data including various photocell 120 configurations, streetlight configurations, and parts handler configurations can be used to train the neural network to determine the position of the UAV 200 relative to the photocell 120. The neural network can be executed either remotely from the UAV 200, such as on an external drone management system (not shown), or internally on the UAV 200, such as on an internal drone management system (e.g., executed on computing system 162 of FIG. 1B). In some implementations, the machine-learning engine 166 is configured to recognize a plug configuration of the connector 280 and use the configuration to orient the UAV 200 and/or position the UAV relative to the streetlight 110. The details camera 275 thus can be used for autonomous fine positioning of the UAV 200. For example, the UAV 200 can navigate generally to the photocell 120 position on the streetlight, and then activate the details camera 275 to enable a close up view of the workspace of the parts handler 300. Both the internal and external drone management systems include one or more computing devices, such as the computing devices described in FIG. 8, below.

Figure 3:
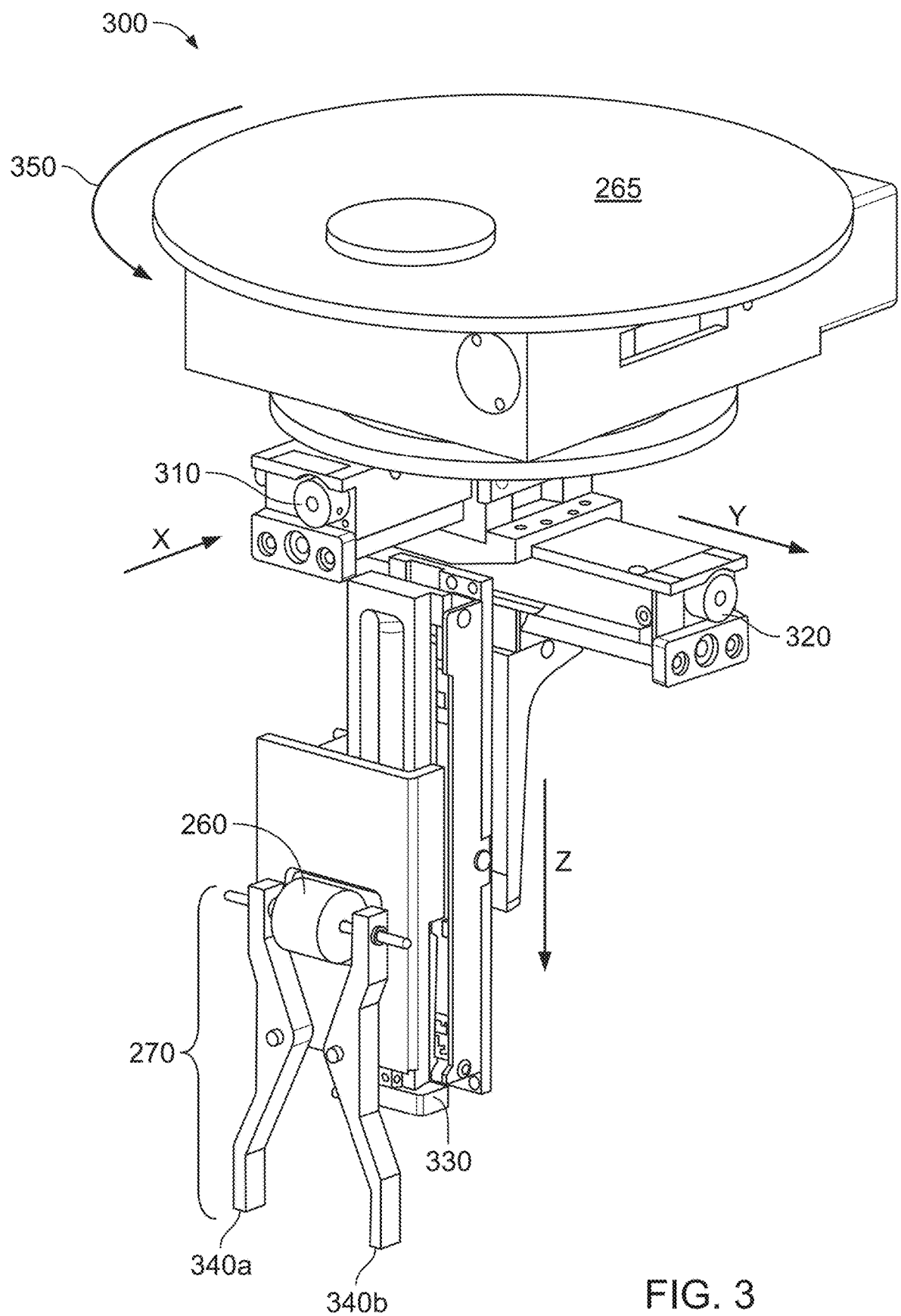
FIG. 3 shows an example of a parts handler of the UAV.

Turning to FIG. 3, the parts handler 300 is shown including a clamp actuator, clamp 270, and clamp rotation motor (s) 265. The clamp rotation motor 265 is configured for rotating the clamp 270 around a Z-axis. The clamp 270 rotates (e.g., shown by arrow 350) to install or remove a photocell 120 that requires rotation to remove it from a threaded receptacle on the luminaire 130. The clamp 270 is opened and closed with the clamp actuator 260. The clamp 270 is configured to grasp the photocell 120 and rotate the photocell to remove the photocell from the luminaire 130. Conversely, the clamp 270 is configured to grasp the photocell 120 to place the photocell in a threaded receptacle for installing the photocell 120 and/or a controller into the luminaire 130. Although the clamp 270 is shown with two prongs 340a and 340b, other clamp configurations are possible. For example, the clamp 270 can include one or more conformable appendages, horizontal grips or prongs, etc.

In some implementations, the clamp includes a shim (not shown) that is used for prying a photocell 120 from a plug during a removal of the photocell from the luminaire 130. The shim is inserted underneath the photocell 120 between the photocell and the luminaire 130. The shim can operate as a wedge between the photocell 120 and the luminaire 130 to loosen the photocell. In some implementations, an additional actuator is used to separate two portions of the shim to force a gap between the photocell 120 and the luminaire 130 during removal of the photocell 120.

In some implementations, the parts handler 300 includes actuators 310, 320, and 330 for adjusting a position of the clamp 270 relative to the UAV 200 in each of the X-axis, Y-axis, and Z-axis, respectively. Thus, when the UAV 200 is relatively stationary with respect to the luminaire 130 (e.g., braced against the streetlight 110 or another external structure nearby), the clamp 270 can adjust to the exact position necessary to align the photocell 120 with a receptacle on the luminaire 130. For example, the clamp 270 can align pins of a connector of the photocell 120 with a plug on the luminaire 130. For example, the clamp 270 can align a thread of the photocell 120 with a threaded receptacle of the luminaire 130. Once the clamp is in the correct position relative to the luminaire 130, the photocell 120 can be removed or installed.

The parts handler 300 rotates around the Z-axis, as shown by arrow 350 in FIG. 3. In some implementations, the parts handler 300 is weighted such that a center of gravity of the parts handler 300 is on the Z-axis and such that rotation of the parts handler 300 does not cause vibration of the UAV 200. The balance of the parts handler 300 ensures that the UAV 200 is steady during installation and/or removal of the photocell 120.

An example of installation and/or removal of the photocell follows. The UAV 200 navigates to the luminaire 130. The UAV 200 determines exactly where the photocell 120 receptacle is on the luminaire, and hovers above the receptacle. The stabilizing mechanism 150 braces against the luminaire 130 or other portion of the streetlight 110. In some implementations, the UAV 200 hovers in place, braced against the luminaire 130. The parts handler 300 is controlled by the controller of the UAV 200 to fine-tune the three dimensional position of the clamp 270. If installing the photocell 120, the clamp 270 holds the photocell 120 for coupling to the luminaire 130. If removing the photocell, the clamp 270 opens and couples to the photocell that is installed in the luminaire. The UAV 200 then installs the photocell 120 or removes the photocell 120 as described above. For example, the UAV 200 installs the photocell 120 by rotating the parts handler 300 to screw the photocell into a threaded receptacle. In some implementations, the parts handler 300 inserts the photocell 120 into a plug once prongs of the photocell are aligned with the plug on the luminaire. For removal of the photocell 120, the clamp 270 grasps the photocell 120. In some implementations, a shim or other mechanical device pries the photocell out of a plug in the luminaire 130. In some implementations, the UAV 200 unscrews the photocell by rotating the parts handler 300. Once the photocell is free from the luminaire, the UAV 200 can either return to a base or install another photocell. In some implementations, the UAV 200 is configured to remove and install photocells for a luminaire in a single sortie. In some implementations, the UAV 200 is configured to remove photocells or install photocells in multiple luminaries in a single sortie. In some implementations, the UAV is configured to remove and install photocells for multiple luminaires in a single sortie. For example, the UAV 200 can include a storage system for storing old photocells, the UAV 200 can be configured to drop the old photocells at a specified location, etc. In some implementations, the UAV 200 can hold several new photocells for installation. For example, the parts handler 300 can include two clamps that are independently controlled for installing photocells. In some implementations, the parts handler 300 can be configured to retrieve a photocell from a storage on the UAV for installing in a luminaire, without requiring a trip back to a base to retrieve a new photocell.

Figure 4A:
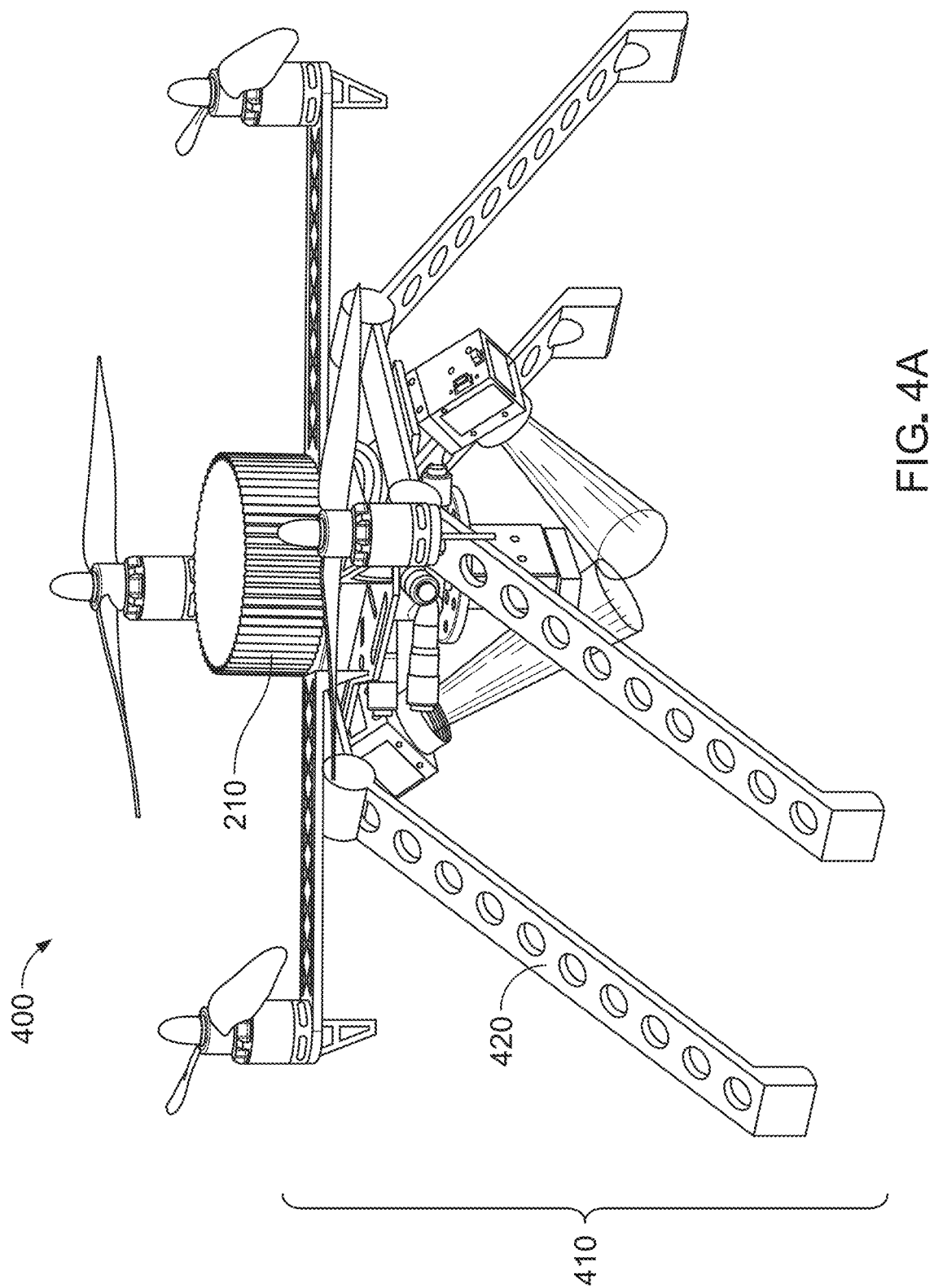
FIG. 4A shows a perspective view of an example UAV for infrastructure maintenance.
Figure 4B:
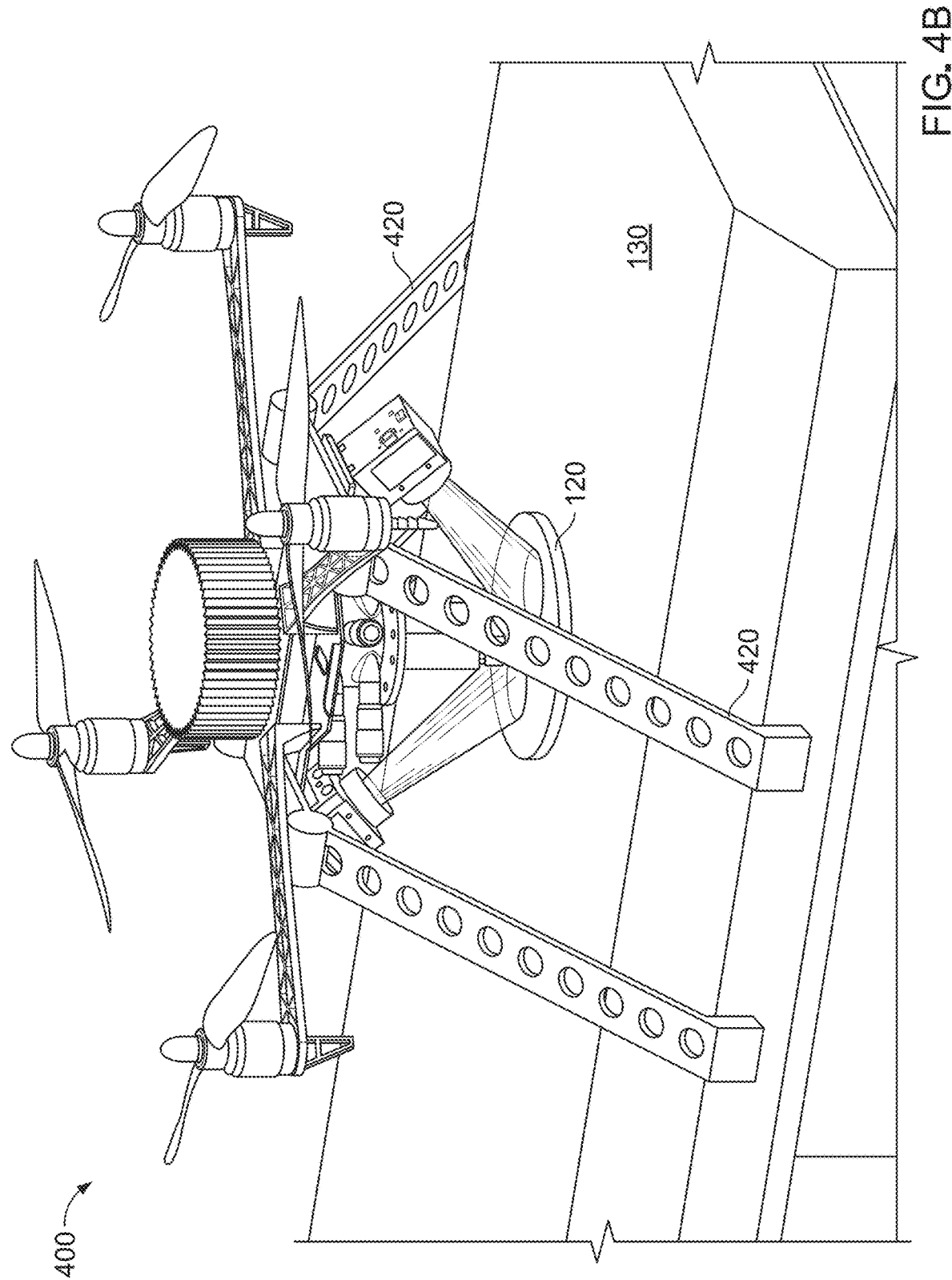
FIG. 4B shows a perspective view of the UAV of FIG. 4A in an engaged configuration with a streetlight.
Figure 4C:
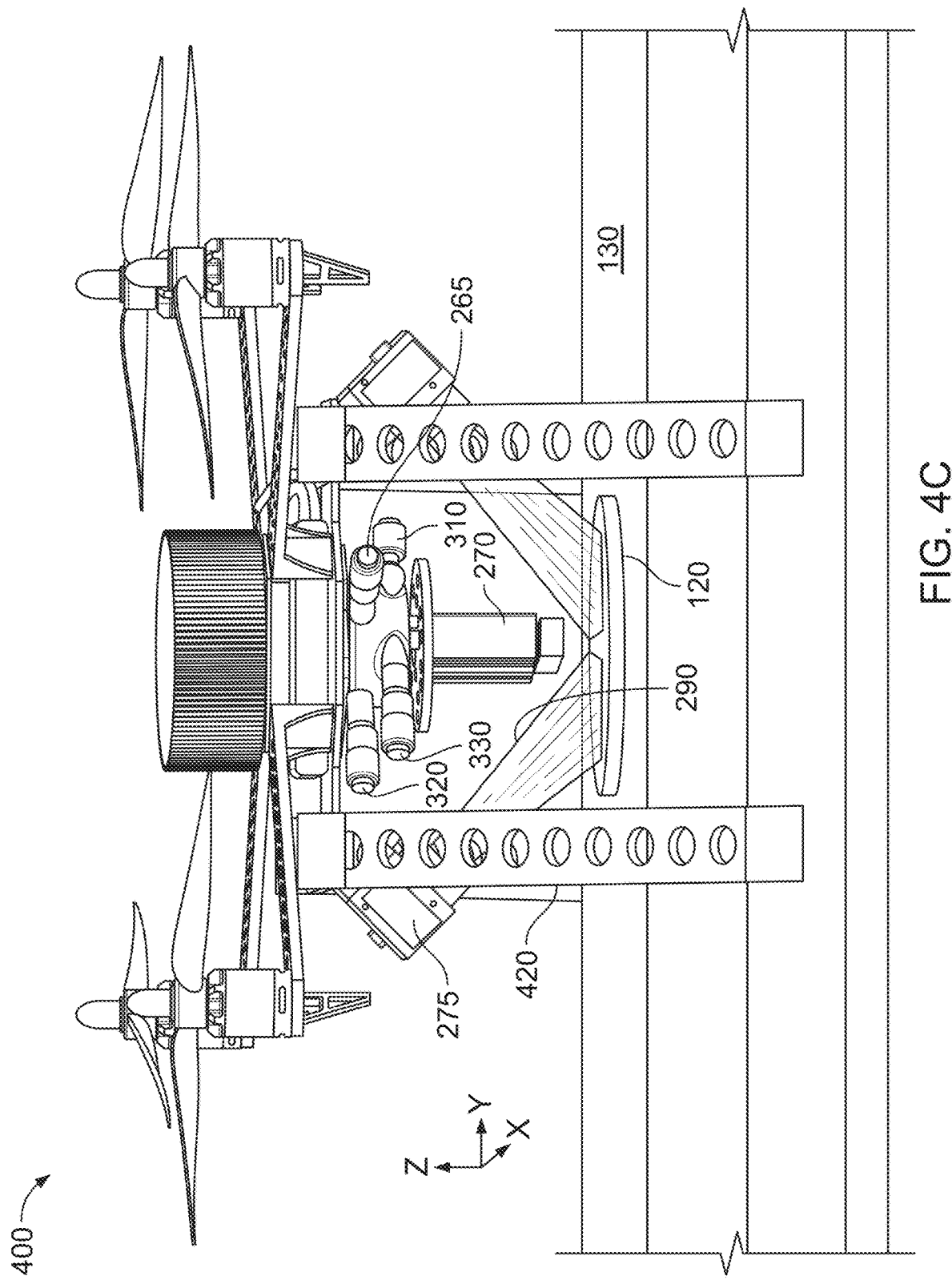
FIG. 4C shows a side view of the UAV in the engaged configuration of FIG. 4B.

Turning to FIGS. 4A-4C, an example UAV 400 is shown. UAV 400 includes each of the features of UAV 200, except for an alternative stabilizing mechanism 410. As shown in FIG. 4A, the stabilizing mechanism 410 includes legs 420 extending from the body 210. The legs 420 are configured to conform to the luminaire 130 to prevent rotation or movement of the UAV 400 during installation or removal of the photocell 120, e.g., as shown in FIGS. 4B-4C. For example, each leg of the legs 420 can include a pliable material, such as a thin metal strip, that is configured to slide across and around the luminaire as the UAV 200 settles over the luminaire. The legs bend in response to vertical forces to prevent the UAV 200 from imparting a signification force to the luminaire, but also prevent rotation of the UAV during photocell installation and/or removal. The stabilizing mechanism 410 of FIG. 4A-4C shows four legs, but other numbers and configurations are possible. For example, the UAV 400 can include two legs, six legs, eight legs, etc.

In some implementations, the UAV 400 includes a single, hook-shaped leg (not shown). The hook-shaped leg can be configured to conform to the luminaire 130. For example, the hook-shaped leg can be formed of a pliable, semi-rigid material that can expand the hook to conform to the rigid luminaire 130. In some implementations, the hood is rigid but large enough to fit around different sizes and shapes of luminaires. In some implementations, the legs 420 are actuated by one or more motors to move from a stored position to down and around the luminaire to brace the UAV 200 in place. For example, a leg can be configured to unfold or extend from a stored position once the UAV 200 is hovering near the luminaire to brace the UAV for removal/installation of the photocell 120. In some implementations, the legs 420 include a soft material such as gel pads, silicone, etc. that conforms to the shape of the luminaire body. For example, a flexible arm can be controlled to unwind, unroll, etc. around the luminaire once the UAV 200 is positioned over the photocell 120 to brace the UAV.

In FIG. 4B, the UAV 400 positions itself above the photocell 120. The legs 420 can include a semi-rigid material. When the UAV 400 approaches the photocell 120, the legs 420 bend slightly to expand and couple with the luminaire 130. The UAV 400 does not rest on the luminaire 130, but rather the legs 420 conform to the shape of the luminaire 130 to prevent the UAV 400 from rotating or moving during fine positioning of the parts handler 300.

Turning to FIG. 4C, an example of fine positioning of the clamp 270 for UAV 400 is shown. The UAV 400 braces itself to the luminaire 130 using the legs 420 over the photocell 120. The UAV 400 adjusts the parts handler 300 using motors/actuators 265, 310, 320, 330 in each of a rotational axis around the Z-axis, and linearly along the X, Y, and Z-axes with respect to the luminaire 130.

Figure 5:
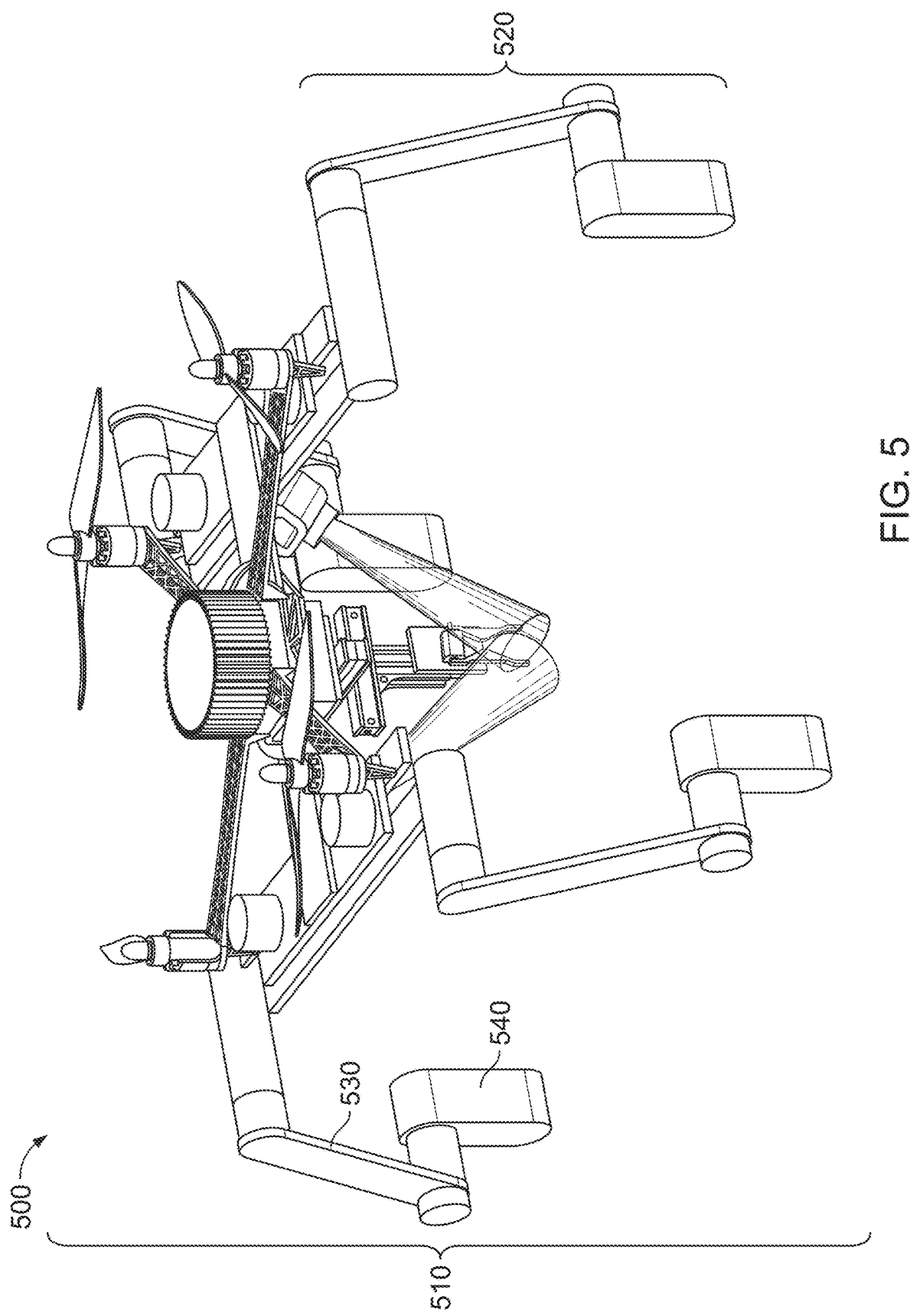
FIG. 5 an example UAV.

FIG. 5 shows an example of a UAV 500 with a stabilizing mechanism 510. The stabilizing mechanism 510 is similar to stabilizing mechanism 410 described above with respect to FIGS. 4A-4C. Each leg 520 of stabilizing mechanism 510 has at least two segments, such as segment 530 and segment 540. Each segment of leg 520 can be independently moved, e.g. by one or more actuators (not shown). Each leg 520 is thus conformable to different shapes of a luminaire 130. The legs 520 can be independently actuated or collectively actuated and controlled by a controller (e.g., controller 164 of FIG. 1B).

Figure 6A:
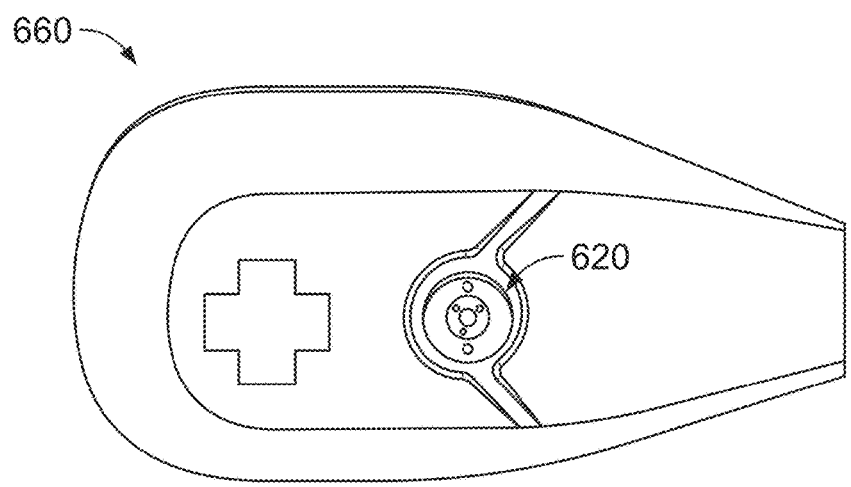
FIG. 6A shows an example of a streetlight.
Figure 6B:
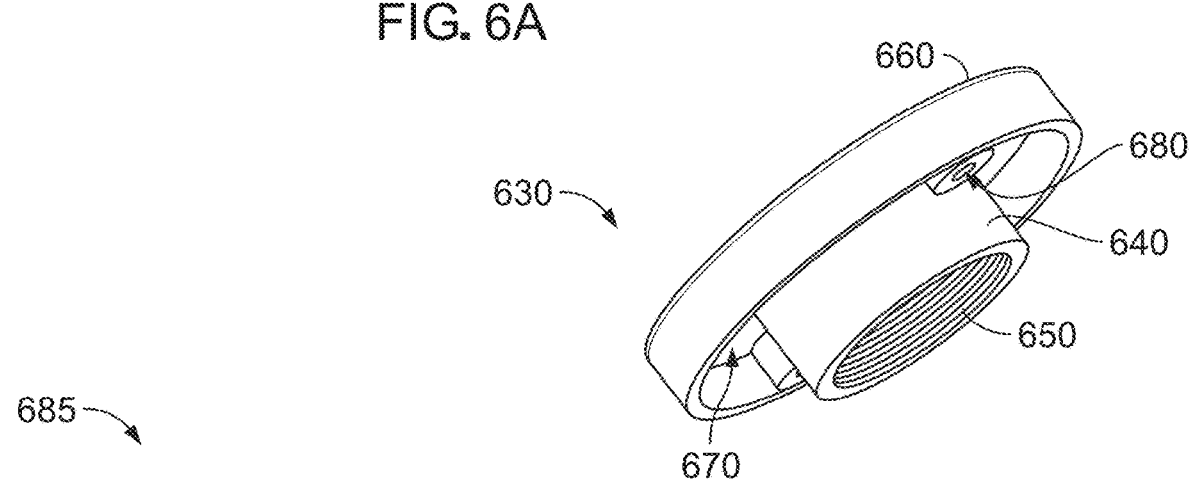
FIGS. 6B-6C show examples of a streetlight controller device.

FIGS. 6A-6B show examples of a streetlight 600 and photocell 610. FIG. 6A shows an example of a streetlight 600 that includes a receptacle 620. In some implementations, the receptacle can be configured to receive a photocell. The receptacle 620 can be compliant with electrical connection standards for the country in which the streetlight is deployed. For example, in the United States, the receptacle 620 can be a receptacle in accordance with standards set by the National Electrical Manufacturers Association (NEMA), and capable of receiving a NEMA plug. In some implementations, the NEMA plug can be a three-pronged twist-locking plug.

A streetlight controller having a plug may be unable to send dimming commands to the streetlight without additional electrical connections (e.g., wires). In some implementations, dimming commands may require two additional electrical connections from the streetlight controller to the streetlight. In some implementations, dimming can be controlled, for example, using a 1-10V lighting control or a Pulse Width Modulation (PWM) interface. Installation of a streetlight controller with two additional wires may entail drilling a hole through the streetlight housing to accept the two additional wires. The two additional wires can then be electrically connected to the streetlight.

Figure 6C:
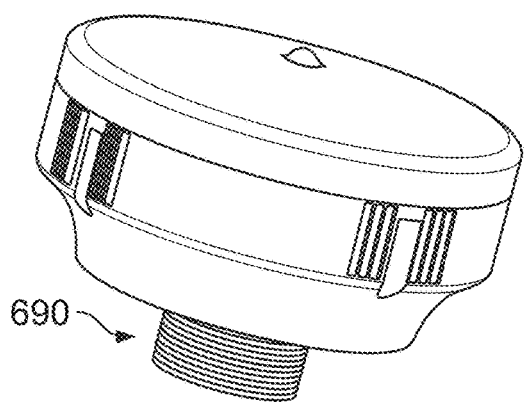

A threaded receptacle 630, as shown in FIG. 6B, can be mounted to the streetlight housing (e.g., luminaire 130) over the opening created by the removal of the receptacle 620. The threaded receptacle 630 can have a cylindrical central portion 640 that has an outside surface and a threaded inside surface 650. The cylindrical central portion 640 can be hollow. The threaded receptacle 630 can have a cylindrical peripheral portion 660 disposed concentric to the cylindrical central portion. In some implementations, the cylindrical peripheral portion 660 is disposed concentric to and on the outside of the outside surface of the central portion 640. The threaded receptacle 630 can have a substantially flat surface 670 that resides between the central 640 and peripheral 660 portions. The substantially flat surface 670 can have one or more fastener receptacles 680 for accepting fasteners for fastening the threaded receptacle 630 to the streetlight housing. FIG. 6C shows an example of a streetlight controller housing 685 that has a threaded portion 690. The threaded portion 690 can be a cylindrical protrusion with a threaded outside surface, attached to the streetlight controller housing 685. The threaded inside surface 650 of the threaded receptacle 630 can be capable of receiving the threaded portion 690 of the streetlight controller housing 685.

In some implementations, the one or more fastener receptacles 680 can be capable of accepting screws. In some implementations, the one or more fastener receptacles 680 can be capable of accepting bolts. In some implementations, the one or more fastener receptacles 680 can be capable of accepting any fastener that is appropriate for fastening the threaded receptacle 630 to the streetlight housing. The streetlight controller housing 685 can contain the streetlight controller. In some implementations, the streetlight controller can have dimming capabilities. The streetlight controller housing 685 can be made from an injection-molded plastic.

In some implementations, the threaded receptacle 630 can have a form factor substantially similar to that of the receptacle 620. The hole that the threaded receptacle 630 is mounted over can be designed to receive the receptacle 620. The threaded receptacle 630 can be made from an injection-molded plastic. The threaded receptacle 630 can have an overall diameter substantially similar to that of the receptacle 620. For example, when replacing a NEMA receptacle, the diameter of the threaded receptacle can be, for example, approximately 2.5 inches. The threaded receptacle 630 can have one or more fastener receptacles 680. In some implementations, the threaded receptacle 630 can have two fastener receptacles.

Electrical connections (e.g., wires) can be attached to the streetlight controller. The wires may be for controlling dimming. The wires can run through the threaded portion 690 of the streetlight controller housing 685, through the threaded receptacle 630, into the hole on the streetlight housing, and connect to the streetlight. The wires that may have been disconnected from the streetlight's previous receptacle 620 may still be connected to the streetlight. These wires can run out of the hole on the streetlight housing, through the threaded receptacle 630, through the threaded portion 690 of the streetlight controller housing 685, and connect to the streetlight controller. Any number of wires can run from the streetlight controller to the streetlight through this path formed by the threaded receptacle 630.

Figure 7:
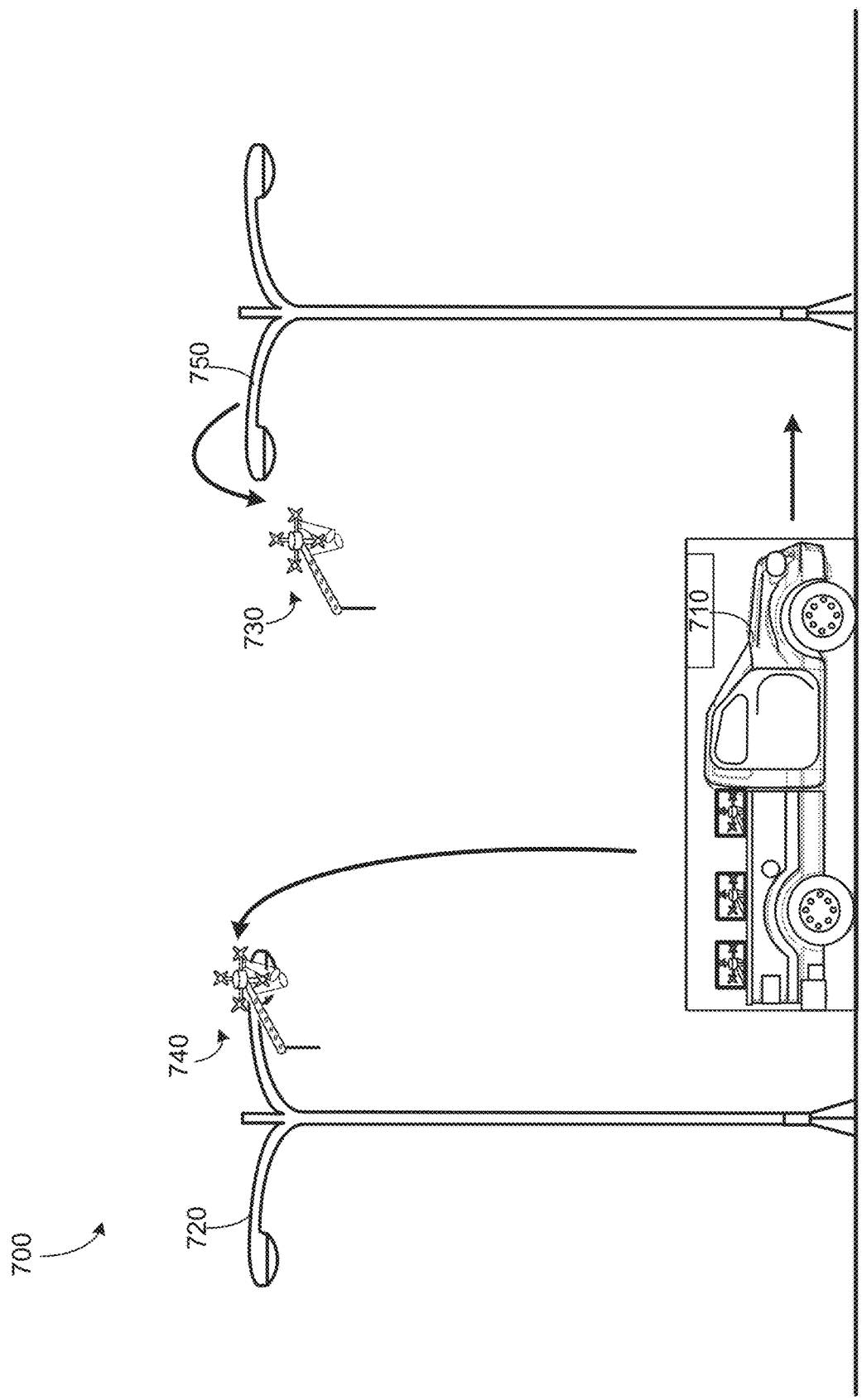
FIG. 7 shows a system for maintaining a streetlight network

FIG. 7 shows a system 700 for replacing photocells in one or more streetlights 720, 750. A base station 710 includes one or more of the UAVs 730, 740 (e.g., each being same or similar to UAV 200, 400, and/or 500). As described above, the base station 710 can be a mobile base station that moves along a street. As the base station 710 moves, UAVs 730, 740 perform sorties at each of the streetlights. A UAV 730 departs the base station 710 and removes a photocell 120 from streetlight 750 (e.g., similar to streetlight 110). A second UAV 740 departs the base station 710 with a new photocell 120. Streetlight 720 has already had its photocell 120 removed by the first UAV 730, and is ready to receive a new photocell. The mobile base station 710 can move along a street and thus replace all the photocells of nearby streetlights quickly and efficiently. In some implementations, base station 710 is stationary, and can be deployed near streetlights 720, 750. Once all photocells have been replaced, the base station 710 including UAVs 730, 740 can be retrieved.

The UAVs 730, 740 can be configured for communication between one another, such as by communication management systems 182 of each of UAV 730, 740. In some implementations, each of UAVs can be assigned a specialized task, such as removing photocells or installing photocells for each of streetlights 712, 750. In some implementations, the UAVs 730, 740 are configured to operate as a swarm (e.g., either as a pair or with additional UAVs not shown). In some implementations, the UAVs can form a mesh network for communicating tasks to one another.

In some implementations, one or each of the UAVs 730, 740 reports to an external UAV management system. The external UAV management system includes a computing system, such as at the base station 710. The external UAV management system receives data from the UAVs 730, 740 including status (e.g., photocell installed/removed successfully, en route, etc.). In some implementations, the external UAV management system can be used by an operator to control one or more of the UAVs 730, 740. The external UAV management system can be used for fine-positioning, such as operating the parts handler 300 once the UAV 730 has autonomously navigated to the photocell 120. The external UAV management system can communicate with one or more of the streetlight controllers to coordinate data between the streetlight network and the UAVs. For example, the external UAV management system may receive data indicating which streetlights need new photocells from the streetlight controllers. For example, the external UAV management system can receive an alert that the photocell 120 for streetlight 750 has failed. In response, the external UAV management system automatically deploys a UAV 730 to the streetlight 750. In some implementations, the external UAV management system deploys UAV 730 after receiving authorization from an operator.

In some implementations, the base station 710 includes an autonomous platform, such as a self-driving vehicle. In some implementations, an operator can operation in the base station 710 and deploy one or more of UAVs 730, 740. In some implementations, two or more mobile base stations may coordinate deployment and retrieval, respectively, of UAVs 730, 740.

In some implementations, one or more of the streetlights 712, 750 can include a computing system and transmitter. The UAVs 730, 740 are configured to communicate with the computing systems of the respective streetlights 712, 750. The UAVs 730, 740 are each configured to recognize a signal (e.g., an alert, beacon, transmission, etc.) of a streetlight indicating that the streetlight requires maintenance. For example, a streetlight 712, 750 beacons a signal indicating that its photocell is damaged or faulty. The UAVs 730, 740, carried by a mobile base station, recognize the beacon and automatically deploy to maintain the streetlight (e.g., replace the faulty photocell).

Figure 8:
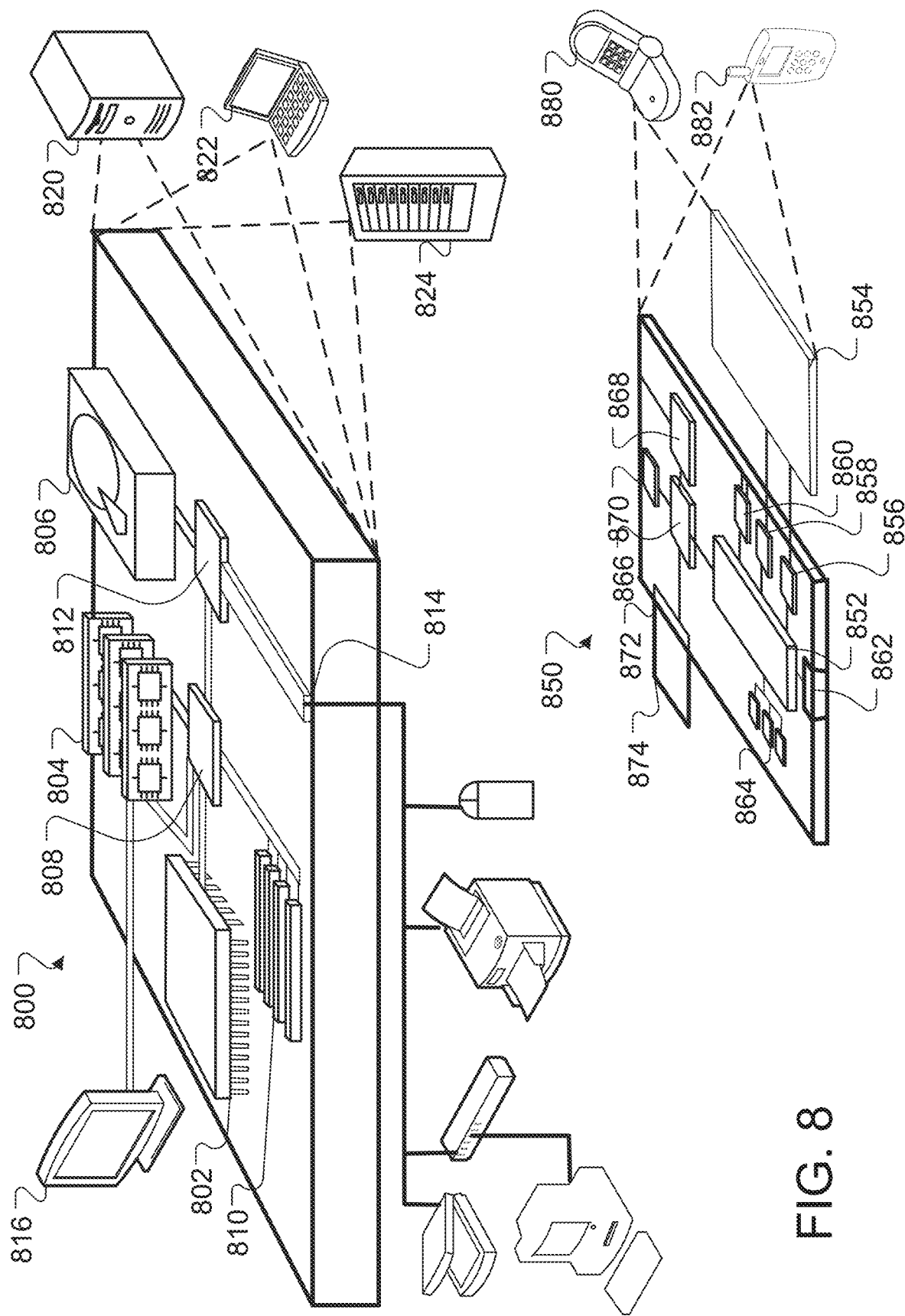
FIG. 8 shows an example of a computing device.

FIG. 8 is a block diagram of computing devices 800, 850 that may be used to implement the computing systems described above (e.g., computing system 162), as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed controller 812 connecting to low speed expansion port 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed interface 808 manages bandwidth-intensive operations for the computing device 800, while the low speed controller 812 manages lower bandwidth-intensive operations. Such allocation of functions is exemplary only. In one implementation, the high-speed interface 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, and an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 852 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In-Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

It will thus be seen that the objects set forth above, among those made apparent from the preceding description, are efficiently attained and, because certain changes may be made in carrying out the above method and in the construction(s) set forth without departing from the spirit and scope of the disclosure, it is intended that all matter contained in the above description and shown in the accompanying drawings shall be interpreted as illustrative and not in a limiting sense.

A number of exemplary implementations of the near sky data platform have been described. Nevertheless, it will be understood by one of ordinary skill in the art that various modifications may be made without departing from the spirit and scope of the described embodiments.

What is claimed is:

1. A method comprising:
   navigating an unmanned aerial vehicle (UAV) to a streetlight;
   causing a stabilizing mechanism of the UAV to contact the streetlight without transferring an entire weight of the UAV to the streetlight;
   causing a parts handler of the UAV to grasp a photocell coupled to the streetlight; and
   causing the parts handler to remove the photocell from the streetlight.

2. The method of claim 1, wherein navigating the UAV to the streetlight comprises causing the UAV to autonomously navigate from a base station to the streetlight.

3. The method of claim 2, wherein autonomously navigating from the base station to the streetlight comprises receiving a signal from the streetlight indicating that maintenance of the streetlight is needed.

4. The method of claim 1, comprising:
   receiving data comprising one or more images from one or more cameras of the UAV; and
   determining a pose of the UAV with respect to the streetlight based on the received data,
   wherein determining the pose comprises comparing the one or more images received in the received data to a set of reference images.

5. The method of claim 4, comprising:
   determining, based on the one or more images, that the stabilizing mechanism is at a target position with respect to the streetlight, and
   responsive to determining that the stabilizing mechanism is at the target position, sending a control signal to the parts handler to rotate the photocell.

6. The method of claim 1, wherein the parts handler comprises a clamp that includes a plurality of prongs for grasping a photocell.

7. The method of claim 1, wherein the stabilizing mechanism comprises a tail extending from the UAV, the tail comprising an anti-rotation plate near an end of the tail opposite a body of the UAV, and wherein the UAV further comprises a counterweight configured to balance the tail to cause the UAV to have a center of gravity near a center of the body.

8. The method of claim 1, wherein the stabilizing mechanism comprises a plurality of legs configured to flex around at least a portion of the streetlight.

9. The method of claim 8, wherein at least one leg of the plurality of legs comprises one or more actuators for moving at least a portion of the at least one leg of the plurality, and wherein the method further comprises changing a configuration of the at least one leg using the actuator.

10. The method of claim 1, wherein the stabilization mechanism comprises a leg configured to unfold to brace the UAV against the streetlight.

11. A method comprising:
    navigating an unmanned aerial vehicle (UAV) to a streetlight;
    causing a stabilizing mechanism of the UAV to contact the streetlight without transferring an entire weight of the UAV to the streetlight;
    causing a parts handler of the UAV to align a photocell supported by the parts handler with a receptacle in the streetlight; and
    causing the parts handler to install the photocell in the streetlight.

12. The method of claim 11, wherein navigating the UAV to the streetlight comprises causing the UAV to autonomously navigate from a base station to the streetlight.

13. The method of claim 12, wherein autonomously navigating from the base station to the streetlight comprises receiving a signal from the streetlight indicating that maintenance of the streetlight is needed.

14. The method of claim 11, comprising:
    receiving data comprising one or more images from one or more cameras of the UAV; and
    determining a pose of the UAV with respect to the streetlight based on the received data,
    wherein determining the pose comprises comparing the one or more images received in the received data to a set of reference images.

15. The method of claim 14, comprising:
    determining, based on the one or more images, that the stabilizing mechanism is at a target position with respect to the streetlight, and
    responsive to determining that the stabilizing mechanism is at the target position, sending a control signal to the parts handler to rotate the photocell.

16. The method of claim 11, wherein the parts handler comprises a clamp that includes a plurality of prongs for grasping a photocell.

17. The method of claim 11, wherein the stabilizing mechanism comprises a tail extending from the UAV, the tail comprising an anti-rotation plate near an end of the tail opposite a body of the UAV, and wherein the UAV further comprises a counterweight configured to balance the tail to cause the UAV to have a center of gravity near a center of the body.

18. The method of claim 11, wherein the stabilizing mechanism comprises a plurality of legs configured to flex around at least a portion of the streetlight.

19. The method of claim 18, wherein at least one leg of the plurality of legs comprises one or more actuators for moving at least a portion of the at least one leg of the plurality, and wherein the method further comprises changing a configuration of the at least one leg using the actuator.

20. The method of claim 11, wherein the stabilization mechanism comprises a leg configured to unfold to brace the UAV against the streetlight.

* * * * *